J. W. STOKER.
POWER TRANSMITTING DEVICE.
APPLICATION FILED APR. 8, 1912.
1,043,641.
Patented Nov. 5, 1912.
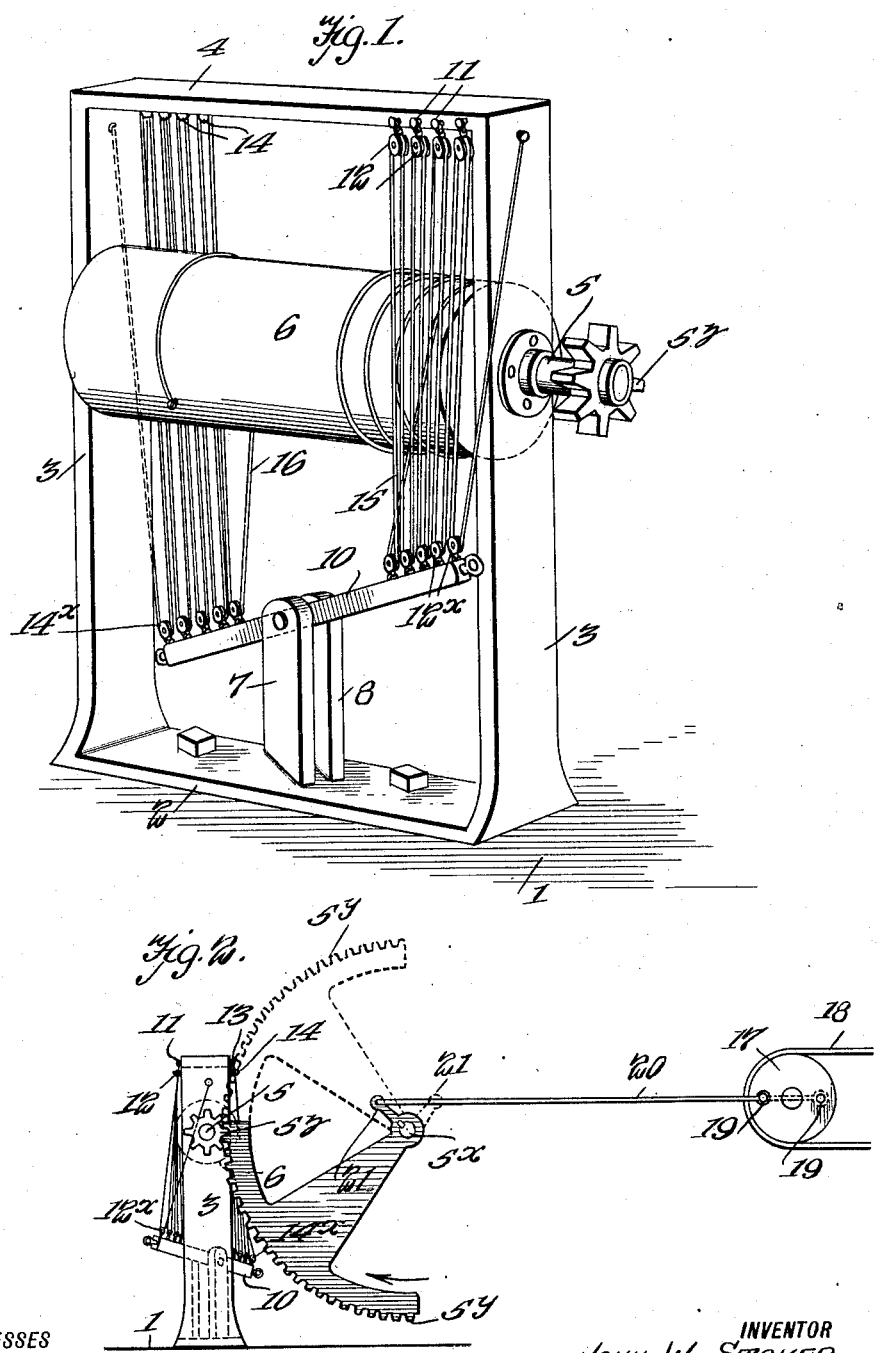
WITNESSES
INVENTOR
JOHN W. STOKER,
BY
ATTORNEYS

UNITED STATES PATENT OFFICE.

JOHN W. STOKER, OF MARION, INDIANA.

POWER-TRANSMITTING DEVICE.

1,043,641.  Specification of Letters Patent.  Patented Nov. 5, 1912.

Application filed April 8, 1912.  Serial No. 689,306.

*To all whom it may concern:*

Be it known that I, JOHN W. STOKER, a citizen of the United States, and a resident of Marion, in the county of Grant and State of Indiana, have made certain new and useful Improvements in Power - Transmitting Devices, of which the following is a specification.

My invention relates to improvements in devices for multiplying power, and consists in the combinations, constructions and arrangements herein described and claimed.

An object of my invention is to provide a simple device for increasing power, which is made of few parts and is not liable to get out of order.

A further object of my invention is to provide a device arranged so that by a slight change the ratio of the increase of power may be varied.

Other objects and advantages will appear in the following specification, and the novel features of the device will be particularly pointed out in the appended claim.

My invention is illustrated in the accompanying drawings forming part of this application in which—

Figure 1 is a perspective view of the device, and Fig. 2 is a side view.

In carrying out my invention I provide a base 1 upon which is mounted a frame consisting of a bottom 2, the uprights 3 and the top 4. Journaled in the uprights 3 is a shaft 5 bearing a drum 6. Beneath the drum are two upwardly extending supports 7 and 8 respectively, these supports being secured to the bottom member 2, and bearing a walking beam 10, which is pivotally mounted on the upright. On one side of the top member 4 is a series of supports 11 for pulleys 12, while on the opposite side of the member 4 and at the opposite end thereof are supports 13 similar to supports 11 for pulleys 14. A series of pulleys $12^x$ are secured to one end of the walking beam 10 while a similar series $14^x$ are secured to the opposite end.

A flexible member 15 such as a rope or cable, is fastened to one end of the drum 6 and is wound around the latter two or three times, thence passing to one of the pulleys $12^x$ on the end of the walking beam, thence over one of the pulleys 12, thence to another pulley $12^x$, and back and forth from the pulleys 12 and $12^x$, the end of the rope being finally secured to the frame 4. A rope 16 is secured to the other end of the drum and is wound around it in the same manner and passes backward and forward between the pulleys 14 and $14^x$, the end being secured to the frame member 4.

I use in connection with my power multiplying device a reversing mechanism such as that shown in Fig. 2. This may be of any suitable type. In Fig. 2, however, I have illustrated this reversing mechanism as consisting of a drive wheel 17 which is arranged to be driven by a belt 18 run by an engine (not shown). An arm 19 on the wheel 17 is connected by means of a pitman 20 with an arm 21 on the end of a shaft $5^x$. A gear $5^y$ drives a gear $5^z$ on the shaft 5 which bears the drum 6. It will be apparent that the revolution of the arm 19 will cause the swinging of the arm 21 from its full line to its dotted line position as shown in Fig. 2, and the consequent rocking or reversing of the shaft 5. As stated, this is given as an example and any other suitable reversing mechanism may be used.

From the foregoing description of the various parts of the device the operation thereof may be understood. The power transmitted by the rock shaft 5 is further transmitted by the drum to the walking beam 10. The passing of the ropes through the pulleys increases the power at a rapid rate so that power derived from the walking beam is much more than that delivered to the drum.

I claim:

A device for transmitting power, comprising a frame, a shaft journaled therein, a drum carried by said shaft, a walking beam pivotally carried by said frame, a series of pulleys carried by one end of the frame on one side of said drum, a series of pulleys carried by the walking beam, a rope wound around one end of said drum and passing back and forth over the pulleys on the frame and the walking beam, the end of the rope being secured to the frame, a series of pulleys on the opposite side of the frame and at the opposite end of the drum, a series of pulleys carried by the opposite end of the walking beam, a second rope wound around the drum and arranged to pass back and forth between the pulleys of the walking beam and the frame, said second rope being secured to the frame, and means for rotating the shaft and for reversing the movement thereof periodically.

JOHN W. STOKER.

Witnesses:
FRANKLIN C. FISHER,
JAMES H. McCLAIN.